Sept. 1, 1959
E. G. ANGER
2,902,634
MOTOR CONTROL CIRCUITS
Filed Nov. 9, 1955
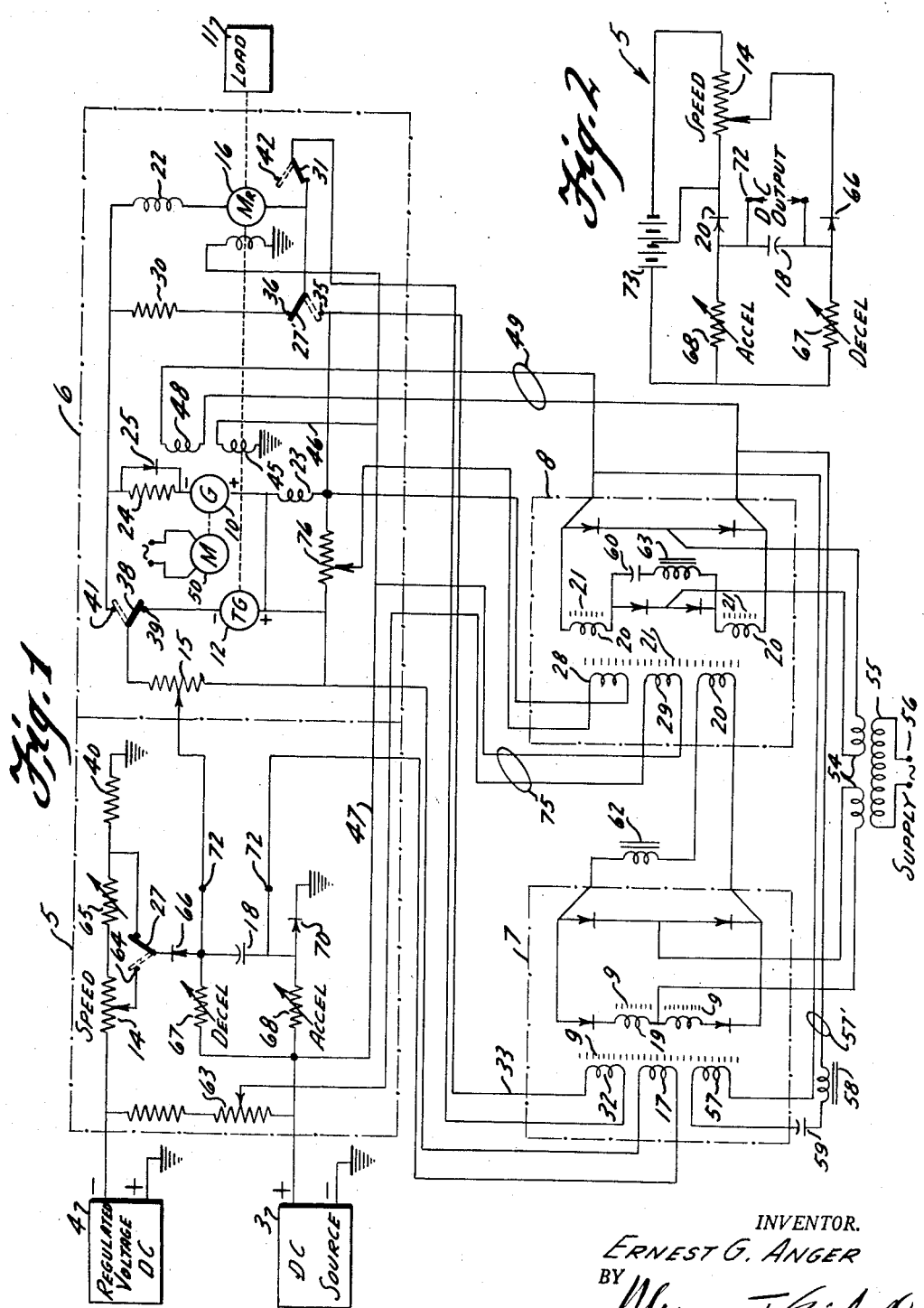
INVENTOR.
ERNEST G. ANGER United States Patent Office 2,902,634
Patented Sept. 1, 1959

2,902,634

MOTOR CONTROL CIRCUITS

Ernest G. Anger, Wauwatosa, Wis., assignor to Square D Company, Detroit, Mich., a corporation of Michigan Application November 9, 1955, Serial No. 545,921

7 Claims. (Cl. 318—251)

The present invention relates to motor control circuits and more particularly to a motor control circuit for regulating the speed, acceleration and deceleration of the motor.

Motor regulatory systems ordinarily include a signal which initiates and governs the response of the system, referred to as a standard or reference against which the actual performance of the system is to be compared. In an adjustable voltage system the speed of a D.C. motor driving a machine may be controlled in a feedback circuit producing a signal which is proportional to the control output quantity or speed. An error measuring element compares the instantaneous values of the standard or reference against the feedback and produces an error signal which is proportional to the algebraic difference. A control section responsive to the error signal produces a control restoring signal to the output or motor for controlling the speed. The invention as described in this specific embodiment is applied to this type of feedback or closed cycle control system.

An object, therefore, of the present invention is a provision of an improved circuit for controlling the speed of a motor.

Another object is to provide an improved circuit for producing an output signal which varies at a predetermined time rate.

A further object of the invention is the provision of an improved time rate circuit for producing an output signal in which the rates of increasing and decreasing outputs are separatley adjustable.

Still another object is to provide an improved circuit for controlling a signal voltage at a predetermined time rate wherein either the buildup or decay of the signal voltage is individually adjustable.

A still further object of the present invention is the provision of an improved time rate circuit for controlling the rate of acceleration and deceleration of a motor.

Another object is to provide a circuit for increasing the stability of a D.C. generator.

A further object is to increase the stability of a D.C. generator during current reversals but maintaining normal regulating characteristics while the current is flowing in the forward direction.

Further objects and features of the invention will be readily apparent to those skilled in the art from the specification and appended drawing illustrating certain preferred embodiments in which:

Figure 1 is a circuit diagram of the preferred embodiment of the invention.

Figure 2 is a modified and simplified form of the circuit diagram of the time rate circuit as extracted from the motor control circuit of Figure 1.

Although the individual voltage supply sources and ground connections are shown to clarify the drawings, it may in many instances be normal to provide common supply sources and ground return connections to the supply line.

Referring now to the drawings, wherein like reference characters designate like or corresponding parts throughout the several views, there is shown in Figure 1 which illustrates a preferred embodiment, a motor control circuit, of the closed cycle control type, including an input section having a D.C. source 3 and a regulated standard reference voltage source 4; a time rate circuit 5, connected to both the unregulated and regulated D.C. supply sources 3 and 4, having an output which is compared with the feedback sginal from the control section 6, resolving the difference which is the control signal applied to the input of amplifiers 7 and 8. The control section includes a power input, viz: a motor-generator set, and a closed loop circuit including the generator 10, and a regulated motor or output to load 11. The feedback control system, included in the control section 6 is provided in the alternative, as shown, by a tachometer generator 12 or a motor armature voltage feedback.

The time rate circuit provides a standard or reference voltage in accordance with the values selected by the speed control rheostat 14 which is compared to an adjusted portion of the feedback voltage taken from the potentiometer or voltage divider 15 wherein the reference is determined by the position of the rheostat 14 as compared to the actual speed of the regulated motor 16. The output of the system, i.e., the regulated motor speed, is controlled by the difference between the reference voltage across time rate delay capacitor 18 and the portion of the tachometer or motor armature feedback taken at the potentiometer 15; which is compared by applying both the reference and the selected portion of the feedback voltage in opposition to form an error measuring element having an output connected across the control winding 17 of the magnetic amplifier 7.

The magnetic amplifier includes a preamplifier stage 7 followed by second amplifying stage 8. An increase in speed or voltage is reflected in the output of the error measuring circuit as a difference voltage which is applied to the control winding 17 of the preamplifying stage. The control winding 20 of the second stage is connected across the preamplifier output and may be wound about the center leg of core 21.

*Time rate circuit and compensating bias*

A voltage divider is connected between the D.C. voltage sources having a tap taken off at a point along the divider to provide a bias and compensating voltage source for application to the associated control winding 29 of the power amplifier 8. The speed rheostat 14 is connected to the regulated source 4 and has a variable tap for controlling the voltage across capacitor 18 and regulation of the motor 16 when contact arm 27 of the "run" switch is closed, positioned to make contact with the terminal 64. A minimum operating speed variable resistor 65 may be connected in series with the speed rheostat 14, a zero speed adjustment resistor 40 and ground. Contact arm 27 connects the speed rheostat to the capacitor 18 through a unidirectional conducting device or rectifier 66 and to the voltage divider 15. A variable deceleration impedance or resistor 67 is connected between a line coupling the rectifier 66 and capacitor 18 and the D.C. source 3; the variable acceleration impedance resistor 68 is connected to the opposite side of capacitor 18, whereby alternate current paths are provided to control the deceleration and acceleration respectively of the motor 16 by varying or adjusting the time constant of the RC circuits formed thereby. An additional rectifier 70 is connected between a line coupling the capacitor 18 and variable acceleration resistor 68 and ground to provide a common current return path while restricting the direction of current flow toward ground.

The time rate circuit as shown in Figure 2 corresponds to the section of the circuit in Figure 1 in which similar reference numerals have been indicated to illustrate the corresponding parts wherein the broadest aspects of the time rate circuit may be realized and wherein the sources 3 and 4 are shown as combined in the form of a single voltage source 73 having an intermediate tap. Varying the speed rheostat tap along the length of resistor element varies the voltage output across output terminals 72 at a controlled time rate as determined by the resistance settings of variable impedances or resistors 67 and 68. Variable acceleration and deceleration resistors 68 and 67 normally pass currents which bypass through rectifiers 66 and 70. However, during a change in output, the currents are diverted to control the rate of charge and discharge of the delay capacitor 18.

Since the polarity of the D.C. source and the rectifiers may be reversed without altering the function of the circuit, the description of the operation will proceed without reference to polarities. An increase in voltage may be produced across the D.C. output terminals 72 by varying the speed rheostat 14; the rate of increase will be determined by the RC time constant of the acceleration resistor 68 and capacitor 18 wherein a charging path is formed from one side of the D.C. source 3 through the variable resistor 68, capacitor 18, rectifier 66, a portion of the rheostat, if any, and the opposite side of the D.C. source. Assuming a decrease in voltage output is desired, the rheostat is adjusted to the lower voltage whereupon the transient time is determined by the RC time constant of the deceleration resistor and capacitor and the current discharging path is formed from one polarity of the D.C. source adjacent to the variable resistor 67 through the delay capacitor 18, rectifier 70 to ground.

With reference to the motor control circuit application, the speed is varied in accordance with the time rate circuit constants whereupon a desired increase in speed is set on the speed rheostat increasing the voltage between ground and the rheostat tap. A sudden increase in voltage cannot produce an immediate change in the charge of the capacitor 18, therefore, the voltage transient appears across the acceleration resistor 68 whereupon rectifier 70 blocks off as the voltage across it reverses and a charging path is formed through delay capacitor 18 and the portion of the resistance included by the tap of the rheostat 14. During the transition period the capacitor 18 will charge at a rate determined by the setting of the variable acceleration resistor 68 until the voltage across the capacitor 18 equals the voltage of the rheostat setting when the rectifier 70 resumes conduction and the current flows to ground through the rectifier 70. A sudden decrease in motor speed by variation of the rheostat 14 blocks rectifier 66 due to the reversal of polarity across said rectifier and a current discharge path is formed through the deceleration resistor 67, capacitor 18 and rectifier 70 to ground, wherein the time necessary to reduce the speed of the motor and/or the voltage to the new level or setting of the potentiometer is determined by the RC time constants of the variable resistor 67 and the capacitor 18.

As is evident from the description of the operation of the time rate circuit of Figure 2, an extremely simple circuit has been provided for controlling the rate of increasing or decreasing the voltage output.

Control circuit

Within the control section, the output element or regulated motor 16 is connected in a closed loop circuit including: the generator 10, generator commutating field winding 23, including in series a stabilizing resistor 24 and shunting rectifier 25. The closed loop circuit is shown in standby operation wherein the generator drive motor and A.C. control supply are normally energized but the switch contact arms 27' and 27 prevent connection of generator power to the armature of the regulated motor and the signal voltage of the speed rheostat 14 to the regulating amplifier through the time rate circuit. Contact arm 27', as shown, connects the regulated motor armature to the dynamic braking circuit including a dynamic braking resistor 30 wherein the armature of the regulated motor 16 is connected in series with said resistor.

A standby signal switch having a contact arm 31 is provided in conjunction with the tachometer feedback circuit and used jointly therewith for a high gain regulator system when tachometer regulation is employed. The voltage developed across the dynamic braking resistor by the counter E.M.F., which is proportional to the coasting motor speed, is connected to one side of the standby control winding 32; the other side of the winding is connected to the generator output through line 33 and to the generator commutating field, whereby the counter E.M.F. of the motor is compared with the generator output. The polarity of standby control winding 32 on the center leg of core 9 decreases the amplifier output to the generator shunt field 48 when an excess of motor counter E.M.F. appears across the winding 32. The additional winding and the connections to the motor and generator provide a standby preconditioning element wherein the standby control winding 32 across the contact 35 and contact arm 36 will regulate the generator voltage to that of the motor both when idle or coasting so that restarting can be achieved during either period. Further, under the condition of motor coasting and restart, the feedback to the standby control winding 32 regulates the system to the difference between the generator and motor armature voltages rather than to the generator alone, whereby no conventional anti-restart relay is required.

Upon positioning of the contact arm 38, as shown in the drawings, the potentiometer 15 adjusting the feedback voltage to the error measuring circuit is connected in parallel or across the tachometer generator 12 through the contact arm 38 and contact 39 for extremely close motor speed regulation. The tachometer generator provides a precision feedback signal of motor speed and may be mechanically coupled to the regulated motor 16. Since the two stage regulating amplifier is designed to have high gain and therefore increased sensitivity to input error signals when it is operating in a feedback circuit element, the zero speed adjustment resistor 40 is not suitable for insuring the safe low generator output during the standby condition when no regulating feedback signal is available from the tachometer generator and a slight error in the setting or an equivalent change due to deviation in supply voltage or resistance of the windings can cause an appreciable drift in the generator output in either positive or negative directions causing excessive starting currents or initial backup of the motor and therefore requiring the additional standby control winding 32 described above.

Armature feedback is shown in the circuit drawings as being alternative, however, it should be understood that most systems which include tachometer and resulting increased sensitivity would not employ armature feedback but for the purpose of illustration the armature feedback circuit is incorporated to demonstrate the versitility of the various features in the motor control circuit herein disclosed. Positioning the contact arms 27' and 38 of the switches to contacts 35 and 41 respectively, the system will be regulated to the armature current feedback to the potentiometer or voltage divider 15 wherein the potentiometer 15 would be ordinarily adjusted on change over for the difference between armature and tachometer feedbacks to obtain an equivalent speed. The additional control winding is disconnected from the closed loop circuit of the motor and generator by the positioning of the switch or contact arm 31 on the open contact 42 and a standby signal is set by the value of the zero speed adjustment resistor 40 to maintain the energization of the generator shunt field by the amplifier output whereby the resulting generator output voltage is retained at a desirable small positive value to provide prompt starting of the motor without excessive current inrush when the motor circuit is closed through the "run" switch contacts 27 and 27'.

The energization of the shunt field resulting from the reference voltage provided by the zero speed adjustment resistor 40 overcomes the bucking field excitation provided in excess of the generator residual flux effect. This reference voltage is required since the bucking field is designed normally for sufficient strength to oppose both residual and minimum amplifier cut-off current effects in the shunt field.

An IR compensation resistor connected across the generator commutator field 23 has a variable voltage tap adjusted to the internal resistance of the generator armature for applying a compensating signal across the armature current winding 28 of the magnetic amplifier 8. The IR compensating signal current polarity and direction of said winding aid the self saturation of the amplifier core to increase the output of the power amplifier 8. The bucking field 45 is connected to the D.C. source by lead 46 through line 47 and to ground return, indicated in the drawing by the conventional ground symbol, to induce a flux opposing the generator shunt field winding 48 which is connected to the output of the magnetic amplifier through lines 49.

A stability circuit including a resistor 24 and rectifier 25 are connected in parallel in the closed loop circuit of the motor generator and in series with the generator output. This combination may be required to correct undesirable characteristics found in smaller size generators during deceleration for during the period of deceleration the motor operates as a generator driven by the inertia of the regulated-motor load. The generator 10, operating as a motor, draws current in the opposite direction transmitting torque back to the drive motor 50, pumping power back into the A.C. supply. The reversal of functions occurs as the speed setting reference control voltage is decreased during adjustment of the speed potentiometer decreasing the generator excitation. The armature current reversal occurs as soon as the internal E.M.F. of the generator becomes less than that of the motor.

This unstable condition of the generator may cause the decelerating current to increase out of control during the current reversal despite the delay provided in the magnetic amplifiers to insure reduction of the shunt field excitation at a proper rate. This instability may be the result of the inherent field weakening effect of the flow of the armature current of either polarity, i.e., armature reaction, but in any case, tends to produce poor power regulation during deceleration although increasing stability during normal generator operation and current flow.

The stabilizing resistor 24 reduces the flow of armature current during current reversals and the shunting rectifier 25 conducts current around the resistor to maintain normal generator regulation characteristics while operating in the forward direction.

*Magnetic amplifiers*

The magnetic amplifier circuit includes a preamplifier stage having control winding 17 on the center leg of core 9 of the power amplifier 7 wherein the polarity of the error measuring circuit produces currents in the control winding 17 which tend to desaturate the outer legs during acceleration and under normal loads and speeds opposing the self-saturating action of the power windings 19. Each magnetic amplifier includes a pair of power windings wound on individual core legs associated with a center leg in which diode rectifiers are connected in the circuit to provide full wave rectification of the A.C. current supplied to the D.C. load through the supply line from the secondaries 54 of a transformer having a primary 55 connected to the source 56.

To control the output to the load, preconditioning winding 32 aids the saturation of the power windings and the damping winding 57 opposes a change in saturation of the power windings. The damping winding 57 is connected across the output of the power amplifier through lines 57', choke coil 58, for attenuating signals having frequency above the unrectified supply frequency, and capacitor 59. The capacitor 59 damps or delays the output of the preamplifier in response to the change in the output of the power amplifier 8. A further damping or delay has been provided in the amplifier circuit by capacitor 60 connected between the power windings of amplifier 8 to delay the output of this stage by drawing a desaturating current through the load or power windings 20 when the D.C. amplifier output voltage increases or decreases in response to saturating and desaturating signals in the control winding 20. Additional filter choke coils 62, 63, are provided to filter the full wave rectified A.C. in the amplifier output circuits.

In accordance with the specific embodiment of the invention shown in Figure 1, a positive bias including compensation for supply voltage variation is provided by the control winding 29 in the power amplifier 8 by the voltage divider 63 and the setting of the tap applying a portion of the voltage drop, across the winding 29 through the lines 75 to operate the power amplifier 8 near saturation. The IR compensation as taken off the potentiometer 76 is applied across the control winding 28 to increase the amplifier output adjusting for internal resistance of the generator or armature in response to the voltage drop across the commutating field.

The schematic representation of the magnetic amplifier cores are intended to illustrate cores having a common flux path, whereby the control windings will saturate or desaturate the power winding cores depending upon the direction of the winding and the polarity of the current passing therethrough.

*Operation*

The motor control circuit of Figure 1 is shown in standby condition wherein, as stated before, the drive motor 50 is energized rotating the armature of the generator 10. A "run" switch having contact arms 27 and 27' are normally operated simultaneously and, as shown, are positioned to apply the voltage across the zero speed resistor to the capacitor 18 and connect the armature of the motor 16 across the dynamic braking resistor 30. Considering the run switch, as shown to be in the "open" position; connecting the contact arms 27 and 27' to the zero speed resistor in the time rate circuit and the dynamic braking resistor 30 in the regulated motor circuit; the standby switch contact arm 31 applying the motor armature voltage to the standby winding 32; and the feedback switch contact arm 38 positioned on the contact 39 providing tachometer feedback; the voltage across the zero speed resistor does not insure a safe low generator output during standby condition when no regulating feedback signal is available from the tachometer generator; assuming high gain in the amplifiers 7 and 8.

The excess generator voltage over regulated motor voltage applied across standby control winding 32, decreases the output of the power amplifier to the generator shunt field and provides a strong regulating feedback while the regulated motor is idle; or, a feedback regulating to the difference between generator and motor voltages rather than to the generator voltage alone. The addition of the standby winding to the preamplifier 7, in precise regulatory systems having increased sensitivity, insures a safe low generator output during standby condition when no regulating feedback signal is available despite the sensitivity of the amplifier to slight errors in setting or changes due to deviations in supply voltage or winding resistance, any of which can cause an appreciable drift in the generator output in either polarity causing excessive starting currents or initial backup of the motor.

The system is set into operation regulating the speed of the motor 16 by closure of the "run" switch including contact arms 27 and 27' wherein the contact arms connect the speed rheostat 14 to the capacitor 18 to supply a reference voltage to the error measuring circuit; and the armature of the motor 16 is connected to the generator at contact 35 forming a closed loop circuit. An increasing voltage reference is applied to the error measuring circuit in accordance with the resistance setting of the acceleration resistor 68 and the difference between the reference voltage signal and feedback and the control section is applied to the preamplifier 7 across control winding 17.

Since the polarity of the control winding 17 tends to desaturate the core of the preamplifier 7 in response to input signals tending to increase the speed of the system, the output of the preamplifier is decreased. The control winding of the power amplifier 8 is connected to the output of the preamplifier and has a polarity opposing the self-saturation of the core upon which the power windings are placed, decreases in current in the control winding 20 therefore increases the power amplifier 8 and an increased current output signal is applied across the shunt field 48 of the generator 10. Increasing the field of the generator produces a resulting increased voltage output to the motor armature increasing the speed of the regulated motor 16.

Variations of the regulated motor speed change the feedback voltage across the potentiometer 15 by the change in output voltage of the tachometer generator 12 when the feedback switch contact arm 38 is positioned on contact 39 or when the feedback switch is thrown in the other position of contact 41 connecting the potentiometer 15 to the armature motor 16. The voltage of the motor armature, which is proportional to speed, produces a voltage drop across the potentiometer 15 providing a feedback to the error measuring circuit as adjusted by the potentiometer tap. The feedback and references voltages are compared in the loop circuit including capacitor 18 and the portion resistor element included by the potentiometer tap and the control coil 17.

Adjustment of the tap 15 upwardly along the resistor element of the potentiometer 15 increases the feedback voltage and, as explained before, the movement of the tap of the rheostat 14 towards the reference voltage source 4, along the resistor element increases the reference voltage across the delay capacitor 18. The opposing voltages in the loop circuit may produce a current in either direction, depending upon the speed setting of potentiometer 14 or the feedback voltage across the resistor element of the potentiometer 15 and the adjustment or position of the magnetic amplifiers 7 and 8 on their B—H curve. So called "safe fail" operation is employed whereby opening of the loop or error measuring circuit will reduce the output of the amplifier 8 to a point where the motor speed is reduced to a safe low value due to the self saturation of amplifier 7. In the present embodiment, the control current to the magnetic amplifier should tend to desaturate the core decreasing its output to the control winding of magnetic amplifier 8 wherein the control winding 20 tends to desaturate the core 21 reducing output of the amplifier 8 which is operating near saturation. The bias winding 29 positions the operating point of magnetic amplifier 8 near saturation in the absence of other control signals by applying a positive bias from the voltage divider 63.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. A circuit for controlling the time rate of voltage rise comprising; a D.C. voltage source having an intermediate voltage tap, a variable charging resistor and a rectifier connected in series between one side of said source and the top arranged to pass a quiescent current, a potentiometer resistor element connected between the other side of the source and the top, a delay capacitor connected between said charging resistor and rectifier and a tap on the potentiometer, whereby the tap on the potentiometer varies the static voltage across the capacitor and the charging resistor controls the time rate of increase of said capacitor voltage.

2. A circuit for varying the time rate of a voltage decay comprising; a D.C. voltage source having an intermediate voltage tap, a potentiometer having resistor element connected between one side of said source and the tap, a rectifier having one side connected to a tap of the potentiometer, a variable charging resistor connected in series with the other side of the rectifier and the other side of said source, a delay capacitor having one side connected to a junction between the rectifier and charging resistor and the other side connected to the source tap whereby the potentiometer varies the static voltage across said capacitor and the variable charging resistor controls the time rate of decrease of said voltage.

3. A circuit for supplying a voltage output and separately controlling the time rate of rise and decay of the voltage output comprising; a source of voltage supply having an intermediate tap, a first charging impedance connected across from a first side of said source to said tap through a unidirectional device arranged for conducting current in a direction consistent with the polarity of the source, a second charging impedance connected across from said first side to the second side of said source through a second unidirectional device arranged for conducting current in a direction consistent with the polarity of said source, and a delay capacitor having its ends respectively connected to a junction between the respective charging impedances and rectifiers to form RC circuits of either polarity.

4. A circuit for supplying a voltage output and separately controlling the time rate of rise and decay of the voltage output comprising; a source of voltage supply having an intermediate tap, a first charging impedance connected across from a first side of the source to said tap through a unidirectional device which is arranged for conducting current in a direction consistent with the polarity of the source, a second charging impedance connected between the first side to the second side of said source through a second unidirectional device which is arranged for conducting current in a direction consistent with the polarity of said source, a delay capacitor having its ends respectively connected to junctions located between charging impedances and rectifiers to form RC circuits of either polarity and means for varying the voltage to the second charging impedance from the second side of said source to change the static voltage charge of said capacitor.

5. A circuit for supplying a voltage output and separately controlling the time rate of rise and decay of the voltage output comprising; a source of voltage supply having an intermediate tap, a pair of variable charging resistors each having a first side connected in parallel to a first side of said source, a delay capacitor connecting the second sides of said resistors, a rectifier connecting one of said resistors and adjacent capacitor plate to said tap and conductive in same direction as the polarity of the source, a potentiometer having a resistor element and a variable tap, said resistor element having an end connected to the other side of said source, a second rectifier connecting the other of said charging resistors and adjacent capacitor plate to said variable tap whereby the static voltage across said capacitor is varied by adjusting said variable tap and the transient time rates are controlled individually by said charging resistors.

6. In combination with a motor control feedback circuit, a time rate circuit comprising; a source of voltage supply having an intermediate tap, a pair of variable charging resistors in parallel circuits each having a first and a second side with the first sides thereof connected to a first side of said source, a delay capacitor connecting the second sides of said resistors, a rectifier connecting a first of said resistors and adjacent capacitor plate to said tap and conductive in the same direction as the polarity of said source, a potentiometer having a resistor element and a variable tap, said resistor element having an end connected to the other side of said source, a second rectifier connecting a second of said charging resistors and adjacent capacitor plate to said variable tap whereby the static voltage across said capacitor is varied by adjusting said variable tap and the transient time rates are controlled individually by said charging resistors.

7. In combination with a motor control feedback circuit including; a drive motor, an A.C. source energizing the drive motor, a generator driven by the motor and having a shunt field and an armature and a regulated motor having an armature connected in a closed loop circuit with the generator armature wherein a shunt field of the generator controls the generator output, a control circuit and an error measuring circuit coupled to said control circuit, a feedback circuit coupled to said motor armature and to said error circuit, magnetic amplifiers coupled to an output of said error circuit and having a positive bias and a voltage supply compensating control windings connected to said A.C. source, a time rate circuit connected to delay the response of the error circuit comprising; a source of voltage supply having an intermediate tap, a pair of variable charging resistors in parallel circuits each having a first side connected to a first side of said source, a delay capacitor interconnecting other side of said resistors, a rectifier connecting the other side of one of said resistors and adjacent capacitor plate to said tap and conductive in the same direction as the polarity of said source, a potentiometer having a resistor element and a variable tap, said resistor element having an end connected to the other side of said source, the other end of the other rectifier connecting a second of said charging resistors and adjacent capacitor plate to said variable tap whereby the static voltage across said capacitor is varied by adjusting said variable tap and the transient time rates in the error circuit are controlled individually by said charging resistors.

References Cited in the file of this patent

UNITED STATES PATENTS

| | | |
|---|---|---|
| 1,071,522 | Kramer | Aug. 26, 1913 |
| 1,774,138 | Grosswedge | Aug. 26, 1930 |
| 2,229,952 | Whitely et al. | Jan. 28, 1941 |
| 2,259,647 | Logan | Oct. 21, 1941 |
| 2,320,841 | Abell | June 1, 1943 |
| 2,519,339 | Avery | Aug. 22, 1950 |
| 2,577,137 | Low | Dec. 4, 1951 |
| 2,629,847 | Eames et al. | Feb. 24, 1953 |

FOREIGN PATENTS

| | | |
|---|---|---|
| 700,897 | Great Britain | Dec. 9, 1953 |

UNITED STATES PATENT OFFICE
CERTIFICATE OF CORRECTION

Patent No. 2,902,634                                            September 1, 1959

Ernest G. Anger

It is hereby certified that error appears in the printed specification of the above numbered patent requiring correction and that the said Letters Patent should read as corrected below.

Column 8, lines 3 and 5, for "top", each occurrence, read -- tap --; column 10, line 11, strike out "the other end of the other" and insert instead -- a second --; same line 11, for "a second" at the end of the line read -- the other end of the other --.

Signed and sealed this 1st day of March 1960.

(SEAL)
Attest:

KARL H. AXLINE

Attesting Officer

ROBERT C. WATSON
Commissioner of Patents